United States Patent
Foltz et al.

(10) Patent No.: US 12,419,315 B2
(45) Date of Patent: Sep. 23, 2025

(54) SYSTEMS AND METHODS FOR OBJECT PROCESSING USING LEVITATION

(71) Applicant: BAADER Food Systems USA, Inc., Kansas City, KS (US)

(72) Inventors: Ryan John Foltz, Bucyrus, KS (US); Ryan Wesley O'Dell, Weatherby Lake, MO (US)

(73) Assignee: BAADER Food Systems USA, Inc., Kansas City, KS (US)

( * ) Notice: Subject to any disclaimer, the term of this patent is extended or adjusted under 35 U.S.C. 154(b) by 247 days.

(21) Appl. No.: 18/364,449

(22) Filed: Aug. 2, 2023

(65) Prior Publication Data

US 2024/0041058 A1 Feb. 8, 2024

Related U.S. Application Data

(60) Provisional application No. 63/370,171, filed on Aug. 2, 2022.

(51) Int. Cl.
*A22C 21/00* (2006.01)
*A22C 17/00* (2006.01)
*B65G 54/02* (2006.01)

(52) U.S. Cl.
CPC .......... *A22C 21/0053* (2013.01); *B65G 54/02* (2013.01); *A22C 21/0007* (2013.01); *B65G 2203/0258* (2013.01)

(58) Field of Classification Search
None
See application file for complete search history.

(56) References Cited

U.S. PATENT DOCUMENTS

| | | | |
|---|---|---|---|
| 10,926,418 B2 * | 2/2021 | Lu | H02K 7/06 |
| 2006/0288879 A1 * | 12/2006 | Shefet | B65G 47/82 |
| | | | 99/485 |
| 2011/0277420 A1 * | 11/2011 | Peters | B65G 47/844 |
| | | | 198/339.1 |
| 2017/0050332 A1 * | 2/2017 | Bauer | A22C 17/0093 |

(Continued)

FOREIGN PATENT DOCUMENTS

| | | | | |
|---|---|---|---|---|
| WO | WO-2021014476 A1 * | 1/2021 | | B65B 1/32 |
| WO | WO-2021150116 A1 * | 7/2021 | | A22C 21/0053 |
| WO | WO-2022148872 A1 * | 7/2022 | | H02K 11/0094 |

OTHER PUBLICATIONS

Matos, T., International Search Report for International Patent Application No. PCT/US2023/071552 dated Aug. 2, 2023, United States Patent Office.

(Continued)

*Primary Examiner* — Gene O Crawford
*Assistant Examiner* — Muhammad Awais

(57) ABSTRACT

A system and method for object processing using magnetic levitation includes moving carriers with drive magnets across an array of planar motors. Food items on the carriers are moved through processing steps. The system determines the weight of multiple food items and coordinates and arranges for the batching of food items totaling a desired weight from an assembly of available food items and presents the selected food items to an operator for further processing. The system moves the carriers to engage the food items with processing equipment, such as for attaching to poultry shackles, or for cutting by a filet machine.

20 Claims, 5 Drawing Sheets

(56) References Cited

U.S. PATENT DOCUMENTS

| | | | |
|---|---|---|---|
| 2017/0179806 A1* | 6/2017 | Lu | H02N 15/00 |
| 2018/0162659 A1* | 6/2018 | Wipf | B65G 54/02 |
| 2019/0283084 A1* | 9/2019 | Foltz | B07C 5/18 |
| 2019/0297903 A1* | 10/2019 | Van Der Waal | A22B 7/002 |
| 2021/0336522 A1* | 10/2021 | Flixeder | H02K 16/00 |
| 2021/0362194 A1* | 11/2021 | Lundahl | B07C 3/14 |

OTHER PUBLICATIONS

Matos, T., International Written Opinion for International Patent Application No. PCT/US2023/071552 dated Aug. 2, 2023, United States Patent Office.

* cited by examiner

SYSTEMS AND METHODS FOR OBJECT PROCESSING USING LEVITATION

CROSS-REFERENCE TO RELATED APPLICATIONS

This application claims priority in U.S. patent application Ser. No. 63/370,171, filed Aug. 2, 2022, the contents of which are hereby incorporated by reference.

BACKGROUND

Movement of objects through a processing system is influenced by characteristics of the objects, and the processes to be performed on the object. Objects, such as food parts, are processed, in part, based on the type of food part, size, weight, and desired grouping. Conventional processing techniques introduce error into the processing system such as assembly of food parts for packaging or further processing.

SUMMARY

The disclosed subject matter includes a food processing system, including a plurality of planar motors forming a conveyor system, with the planar motors producing magnetic fields that levitate a plurality of independently movable carriers that support food parts. The assembly of planar motors forms a conveyor system with a holding area disposed between a first area and a second area. Food parts are transferred to the carriers, and in an implementation the system determines one or more characteristics of the food parts, such as weight. The system assembles loaded carriers in the holding area and selects carriers to move to the second area that meet the desired criteria for further processing. In some implementations the desired criteria is a batch of one or more food parts with one or more characteristics, such as food parts totaling a batch weight. The system identifies the one or more carriers that include food parts that meet the total batch weight and move the carriers to the second area for further processing, such as the packaging of the food parts into a receptacle for distribution to consumers.

As the food parts enter the system, one or more characteristics of the food part can be assessed or determined by the system and assigned to the food part to remain associated with the food part during further processing, such as the form of the food part (a whole animal or parts of an animal, such as leg, thigh, half, quarter, etc.), type of food part (poultry, fish, seafood, etc.), weight, grade, shape, orientation on carrier, source identifying information, etc.

In an implementation, the system identifies one or more carriers that have the desired criteria for further processing and the carriers are rotated into position at the second area depending on the orientation of the food parts on the carriers. The positioning of a food part by the carrier aids in the carriers moving the food parts for engagement with processing equipment, including poultry shackles or fish filet machinery.

BRIEF DESCRIPTION OF THE DRAWINGS

The present disclosed subject matter is described herein with reference to the following drawing figures, with greater emphasis being placed on clarity rather than scale.

DETAILED DESCRIPTION

Figure 1:
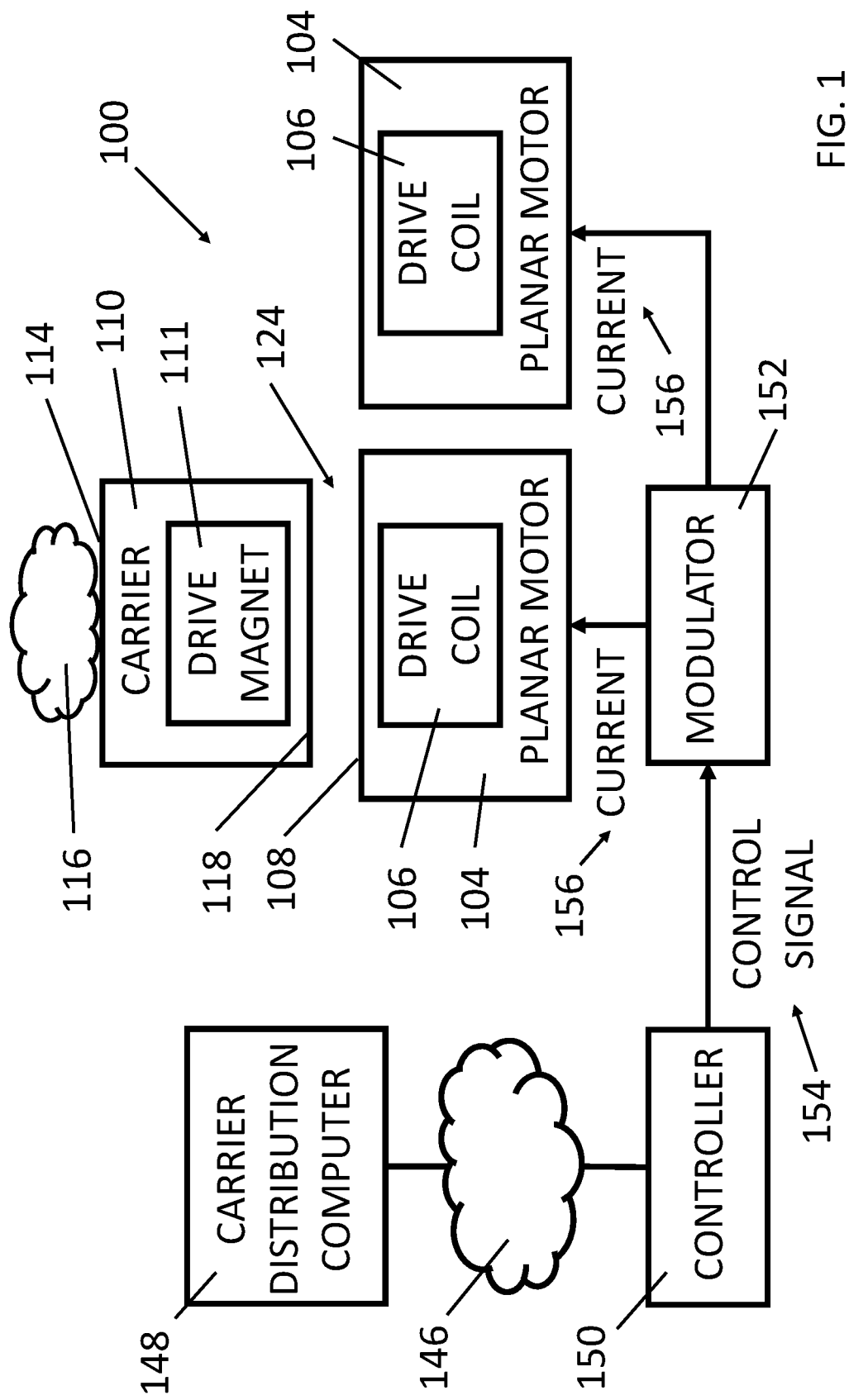
FIG. 1 is a schematic diagram of an implementation of the disclosed subject matter.

An apparatus and method for item 116 processing using a magnetic levitation system 100 is shown and described in the following detailed description and drawings. The system 100 includes an electromagnetic conveyor system 102 having planar motors 104, with a plurality of carriers 110 independently movable across an array of drive coils 106 or stators. The system 100 moves carriers 110 asynchronously in a processing operation 200 from a first area or location 202 to a second area or location 222, presenting items 116 on the carriers 110 to operators or processing equipment for sorting, batching, and loading.

The electromagnetic conveyor system 102 is a conventional planar motor assembly, such as the system provided by Planar Motor, Inc. of Richmond, B.C., Canada. Planar Motor owns several patents directed to planar motor assemblies, including U.S. Pat. No. 10,926,418, the entire disclosure of which, except for any definitions, disclaimers, disavowals, and inconsistencies, is incorporated herein by reference. Referring to FIG. 1, the electromagnetic conveyor 102 includes a plurality of adjacent planar motors 104 with drive coils 106 arranged adjacent to each other in a configuration about which a plurality of carriers 110 are moved under computer control. In an implementation, the carriers 110 are generally rectangular in shape, with a top surface 114 for receiving and supporting items 116, and an opposing bottom surface 118. The carriers 110 include drive magnets 111, and the drive coils 106 produce magnetic fields that interact with the drive magnets 111. In an implementation the planar motors 104 are connected to modulators 152 that control electric current 156 provided to the drive coils 106. A controller 150 delivers control signals 154 to the modulators 152 to control current 156 provided to the drive coils 106, thereby creating modulating magnetic fields that interact with the drive magnets 111 of the carriers 110 to controllably move the carriers 110 independently relative to planar motors 104. Computer control of the system 100 may be by way of a carrier distribution computer 148. The carrier distribution computer 148 has circuitry connected to memory. The circuitry may be dedicated circuitry or a general-purpose processor. The carrier distribution computer 148, in operation, controls movement of carriers 110 about the conveyor system 102. The carrier distribution computer 148 is constructed and configured for electrical connection and communication via at least one communications network 146 to the conveyor system 102. In an implementation, the carrier distribution computer is connected to the conveyor system 102 via at least one controller 150.

The magnetic field positions the carrier 110 above the drive coil 106, separating the bottom 118 of the carriers 110 from the top 108 of the drive coil 106 to create an air gap 124. The magnetic field is used to move the carriers 110 about the configuration of an array of two or more adjacent planar motors 104. The controller 150 controls translation of carriers 110 relative to the drive coils 106 by moving along the X-axis, Y-axis, and Z-axis. The X-axis refers to forward and rearward movement across the drive coils 106 in an action called surging. The Y-axis refers to up and down or vertical movement relative to the drive coils 106 in an action called heaving. The Z-axis refers to left and right movement across the drive coils 106 in an action called swaying. The carriers 110 are also able to rotate or turn to face a different axis. Movement between the X-axis and Y-axis is called pitch. Movement between the X-axis and Z-axis is called yaw. Movement between the Z-axis and Y-axis is called roll.

Figure 2:
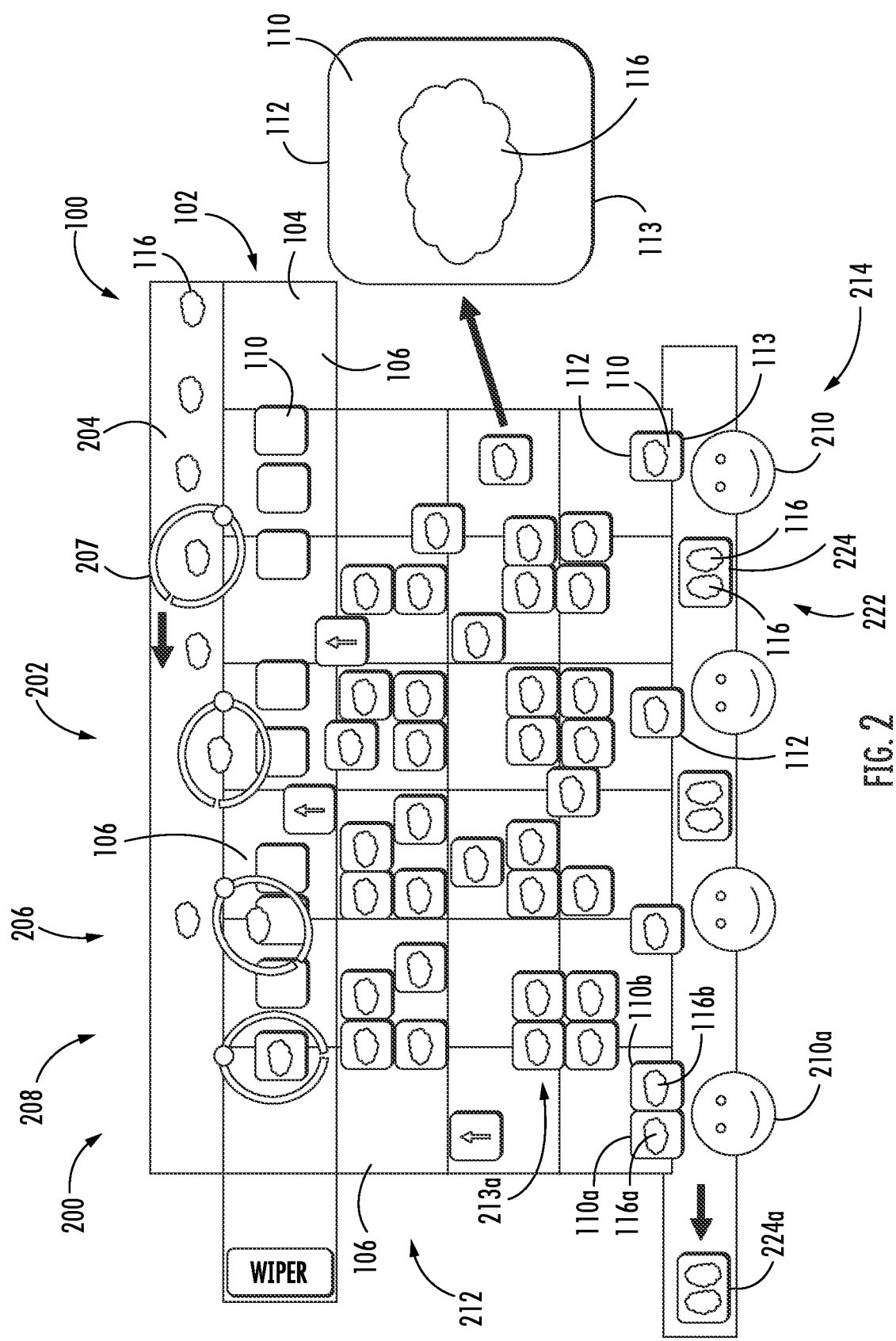
FIG. 2 is a plan view of an implementation of the disclosed subject matter showing the processing of food parts.

Referring to FIG. 2, an implementation of the disclosed subject matter is shown where the system 100 is used in a food processing operation 200. Although the system 100 is hereafter described in use with food processing, the system can be used for the processing of non-food items. The system 100 is used to move a food item 116, such as a food part. Food parts can take the form of whole animal or parts of animals, including, but not limited to, parts of poultry or a whole fish. In an implementation, the system 100 causes the carrier distribution computer 148 to execute processing for moving a poultry item 116 through a processing operation, whereby the poultry items 116 arrive at a first location 202, are moved by a carrier 110 about a plurality of adjacent planar motors 104 from a loading area 208 to a holding area 212 or to an unloading area 214 then to a second location 222, or move from the loading area 208 to the unloading area 214 to the second location 222 where the item 116 next encounters a processing step. In an implementation, the processing operation 200 includes the processing step of a packaging operation that utilizes the system 100 to assemble poultry items 116 into groupings of two or more poultry items 116 that are then prepared for sale and consumption.

The packaging operation includes a first transporter 204, such as a belt conveyor, for moving an incoming poultry item 116 into an arrival location 206. One or more drive coils 106 are arranged adjacent the arrival location 206. The system 100 is programmed to execute processing for moving one or more empty carriers 110 adjacent the arrival location 206 to receive poultry item 116 from the first transporter 204. A manual or automated transfer device 207 moves a poultry item 116 onto the top surface 114 of an empty carrier 110. In an implementation, the transfer device 207 is an arm that guides or moves the poultry item 116 from the first transporter 204 onto the carrier 110. In an implementation, the transfer device 207 is pneumatic and uses bursts of air directed at the poultry item 116 to move the item from the first transporter 204 onto the carrier 110. Once a carrier 110 is loaded with a poultry item 116, the system 100 is programmed to execute processing for determining the weight of the poultry item 116 and associate the weight with the carrier 110, and optimally determine the type of the poultry item 116 on the carrier 110, such as by photo imaging or using the information associated with the item 116 as it travels along the first transporter 204. For example, determining the weight value of an item 116 can be accomplished by calculating the difference in weight between an empty or unloaded carrier 110 and a loaded carrier 110 during the loading step. The unloaded carrier 110 has a known weight value. The controller 150 induces an electric current to levitate the carrier 110, maintaining an air gap 124 whereby the bottom 118 of the carrier is separated from the top 108 of the planar motor 104 by a given separation distance. When a poultry item 116 is moved onto the unloaded carrier 110 the displacement of the loaded carrier 110 above the planar motor 104 along the Y-axis changes, causing the controller 150 to signal the corresponding modulator 152 to change the current 156 supplied to the drive coil 106 to compensate for the resulting displacement and ensure the desired air gap 124 of the given separation distance is maintained. In an implementation, the carrier distribution computer calculates the weight value based on the increased output of current and correlates the weight of the poultry item 116 providing an indication of the weight value of the poultry item 116.

Areas of the first location 202 can be segregated into sectors, where each sector is designated for the loading of carriers 110 with poultry parts 116 of a specific poultry type. The poultry types of poultry items 116 include any consumable part of the animal, such as wings, legs, breasts, and the like. The system 100 is programmed to execute processing for moving the loaded carriers 110 to the holding area 212 or directly to the unloading area 214 depending upon the desired characteristic of receptacles 224 at the unloading area 214. The system 100 assigns receptacles 224 at the unloading area 214 a desired characteristic of a packaged poultry product consisting of one or more poultry items 116, such as the total weight of the poultry product or batch weight and moves loaded carriers 110 from the loading area 208 or the holding area 212 to the unloading area 214, for transfer of the poultry item 116 to a receptacle 224. The system 100 provides the technical advantage of gathering and assembling carriers 110 with items 116 of desired characteristics and determining the optimal combination of items to present to an unloading area 214 that meet the desired characteristics for further processing. When the system 100 determines one or more loaded carriers 110 meet the desired characteristic of a packaged poultry product it executes processing to move the carrier 110 to the unloading area 214. In an implementation, the loaded carriers 110 are moved to an operator 210 who places the poultry item 116 into a receptacle 224. The receptacle 224 then moves along a second transporter 220, such as a belt conveyor, for moving receptacles 224 to further processing operations, such as packaging for sale to consumers.

In an implementation of the poultry processing operation 200, the system 100 is programmed to execute processing for creating batches of poultry items 116. For example, the system 100 determines the weight or validates the weight of the poultry item 116 deposited on the carrier 110 as described above and move the loaded carrier 110 through the poultry processing operation 200. In a weight batching operation, the poultry items 116 on one or more carriers 110 have a known weight value, either associated with the poultry item or it is transferred from the arrival location 206 to a carrier, or as determined by the system 100 by weighing the poultry item by the carrier, and the system 100 moves the carries to an operator 210 depending upon the pre-determined desired total poultry item 116 target weight for a receptacle 224 for a batch of poultry items 116. For example, it may be desired that a receptacle 224 have two poultry items 116 with a target weight totaling eight ounces. A loaded carrier 110a with a poultry item 116a having a weight of 3.5 ounces and a loaded carrier 110b with a poultry item 116b having a weight of 4.5 ounces are moved by the system 100 to an operator 210a for packaging of the items 116a and 116b into a receptacle 224a. The system 100 is programmed to execute processing to identify weighed poultry items 116 and present the poultry items 116 to an operator 210 for batching into a receptacle 224a containing a batch of food items, providing an improvement over prior art poultry processing systems by minimizing the deviation of the resulting batch weight from the target weight.

The system 100 is programmed to execute processing to match loaded carriers 110 to achieve optimal weight combinations not possible with conventional manual animal processing operations by utilizing a holding area as a buffer in the system to allow optimal selection of item weights for a batch, and by utilizing the holding area as a reservoir of available weights for optimal pairing and combining. The system 100 provides a solution to the problem of processing poultry parts that result in a resulting batch weight that either exceeds or falls short of the desired target weight, described in the food processing industry as giveaway by improving the accuracy of the resulting batch weight.

In an application of the batching operation, poultry items 116 having a known attribute are transferred to a carrier 110 at the loading area 208. Attributes include animal type, animal part type, source of live animal, etc. In an implementation, each area of the loading area 208 is dedicated to a specific type of poultry item 116, such as wings, legs, breasts, drumstick, whole leg, leg quarter, back half, whole carcass, etc. In an implementation, carriers 110 are dedicated to a specific type of poultry item 116. In an implementation, each area of the unloading area 214 is dedicated to a specific type of poultry item 116. In an implementation, a loaded carrier 110 is associated with an attribute of the poultry item 116 with the carrier 110, the specific type of poultry item 116, the orientation of the poultry item 116 on the carrier 110, and the weight of the poultry item 116. The combination of two or more of attributes, type of poultry item, weight, and orientation can be an overall characteristic of the poultry item 116.

The loaded carriers 110 are independently moved by the system 100 about the array of drive coils 106. The system 100 is programmed to execute processing to define the array of drive coils 106 into one or more holding locations 213a and arranges loaded carriers 110 into the holding area 212. From the available loaded carriers 110 in the holding area 212, the system 100 is programmed to execute processing to calculate various possible overall characteristic combinations to achieve the desired batch overall characteristic for the available empty receptacles 224 and move specific loaded carriers 110 to an operator 210 at a packing location for transfer of the poultry items 116 to receptacles 224. After the poultry item 116 is removed from the carrier 110, the system 100 moves the empty carrier 110 to the loading area 208 to receive a poultry item 116.

Specific types of poultry items 116 don't have uniform or regular shapes, and the orientation of the items in a receptacle 224 dictates the number of items that can fit in the receptacle 224. In an implementation, the carriers 110 have a first edge 112 and an opposite second edge 113. The unloaded carriers 110 are loaded with a poultry item 116 whereby the item is orientated on the carrier 110 so that a first feature of the poultry item 116 is adjacent the first edge 112, and a second feature of the poultry item 116 is adjacent the second edge 113. The system 100 is programmed to execute processing to present loaded carriers 110 to an operator 210 at the unloading area 214 with either the first edge 112 nearest the operator 210 or the second edge 113 nearest the operator 210, whereby the poultry items 116 are orientated when presented to the operator 210 for optimal placement in the receptacle 224 and minimizing the additional handling of the item 116 by an operator or processing machinery, increasing speed and efficiency of the processing operation.

In an implementation of the poultry processing operation 200, the system 100 is used for sorting and loading poultry items 116. For example, the carriers 110 present the poultry items 116 to an operator 210 for transfer to a processing line for further processing of the poultry item 116. In addition, the carriers 110 transfer the overall characteristics of the poultry item 116 along with the poultry item 116 as it moves to the processing line for further processing. For example, the system 100 is programmed to execute processing to assign a carrier 110 an overall characteristic of the poultry item 116 it is carrying, such as a whole chicken carcass with a weight of 5.5 pounds. In an application of the sorting and loading operation, the carriers 110 can hold live poultry, stunned poultry, eviscerated poultry, and partially processed poultry. In an application of the sorting and loading operation, the carriers 110 include a poultry carcass as the poultry item 116, and the system 100 is programmed to execute processing to synchronize the carriers 110 with the movement of a poultry shackle traveling on a conveyor system along the unloading area 214 whereby the carrier 110 positions the legs 130 of the poultry carcass 128 so they engage the shackle 242 as the shackle 242 moves away from the carrier 110, such as by being elevated above the unloading area 214, thus allowing the shackle to remove the carcass from the carrier 110 for further processing.

Figure 3:
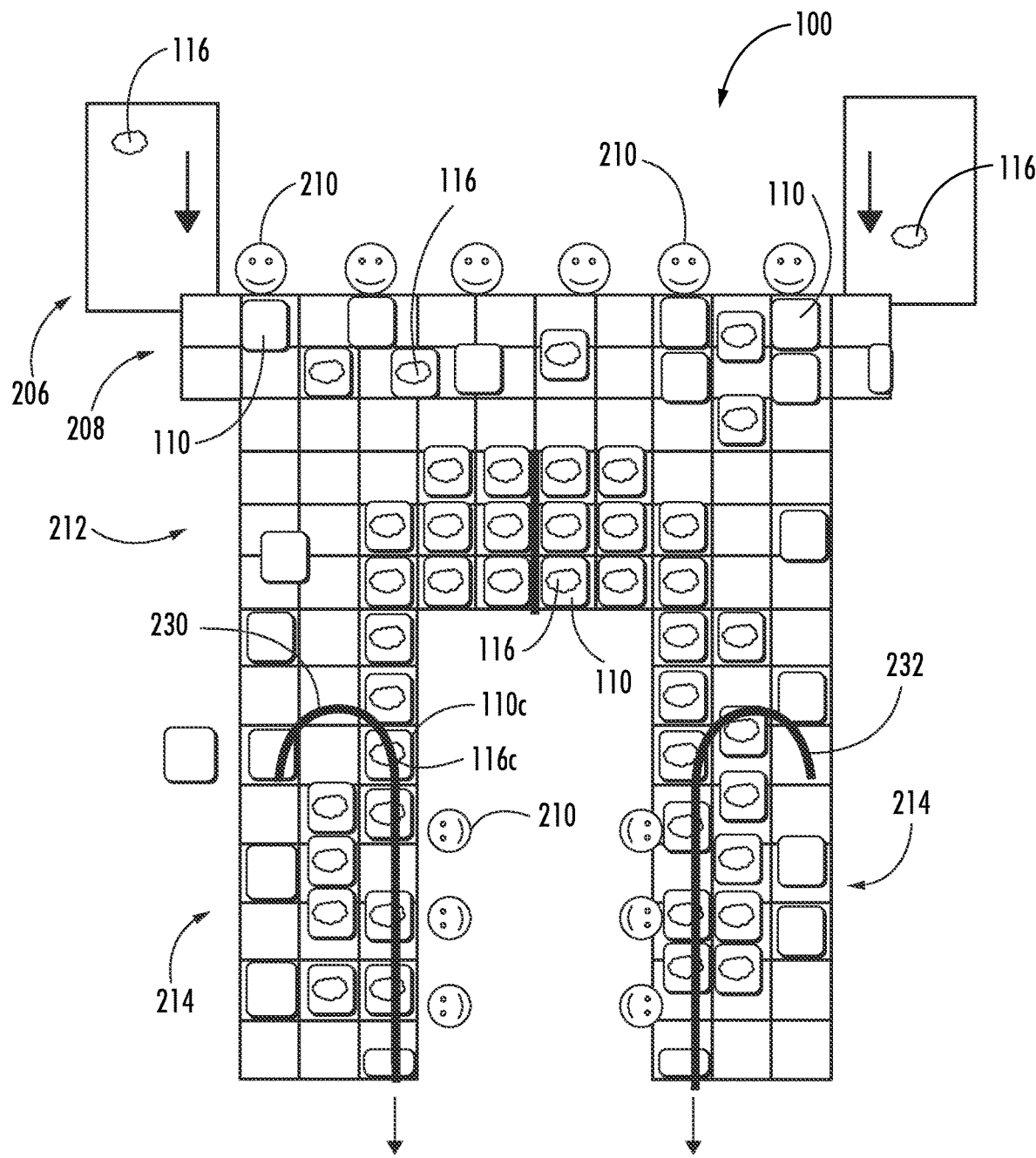
FIG. 3 is a plan view of an implementation of the disclosed subject matter showing the processing of food parts.

Referring to FIG. 3, an implementation of the disclosed subject matter is shown where the system 100 is used in a processing operation 200 to move live poultry items 116, such as a live bird, to processing lines 230 and 232, such as an overhead conveyor. As above, poultry items 116 arrive at a loading area 208, and are held at and depart from a holding area 212 before moving to an unloading area 214. In this example, an operator 210 transfers a live poultry item 116 from an arrival location 206 to a carrier 110. In many poultry processing operations, machines are limited by the poultry item it can accommodate in order for the machine to properly perform its function. For example, the physical size of a live bird is associated with the weight of the bird. In a processing operation 200, a first processing line may be set up to accommodate live birds that weight in a range between approximately three pounds to approximately five pounds, and a second processing line may be set up to accommodate larger live birds, birds that weigh in a range between approximately five pounds to approximately seven pounds. Thus, the two processing lines are set up to accommodate a particular size range of poultry items. The system 100 is programmed to execute processing to have the loaded carrier 110 weigh the item 116 and based on the weight of the item the system 100 moves the weighed item 116c into the holding area 212 for presentment to an operator 210 for transfer of the item from the loaded carrier 110e to either a first processing line 230 or second processing line 232 depending on the weight value of the item 116. The system 100 then associates the weight value of each weighed poultry item 116 with the location of the item on the processing line and this value is tracked for further process optimization.

Figure 4:
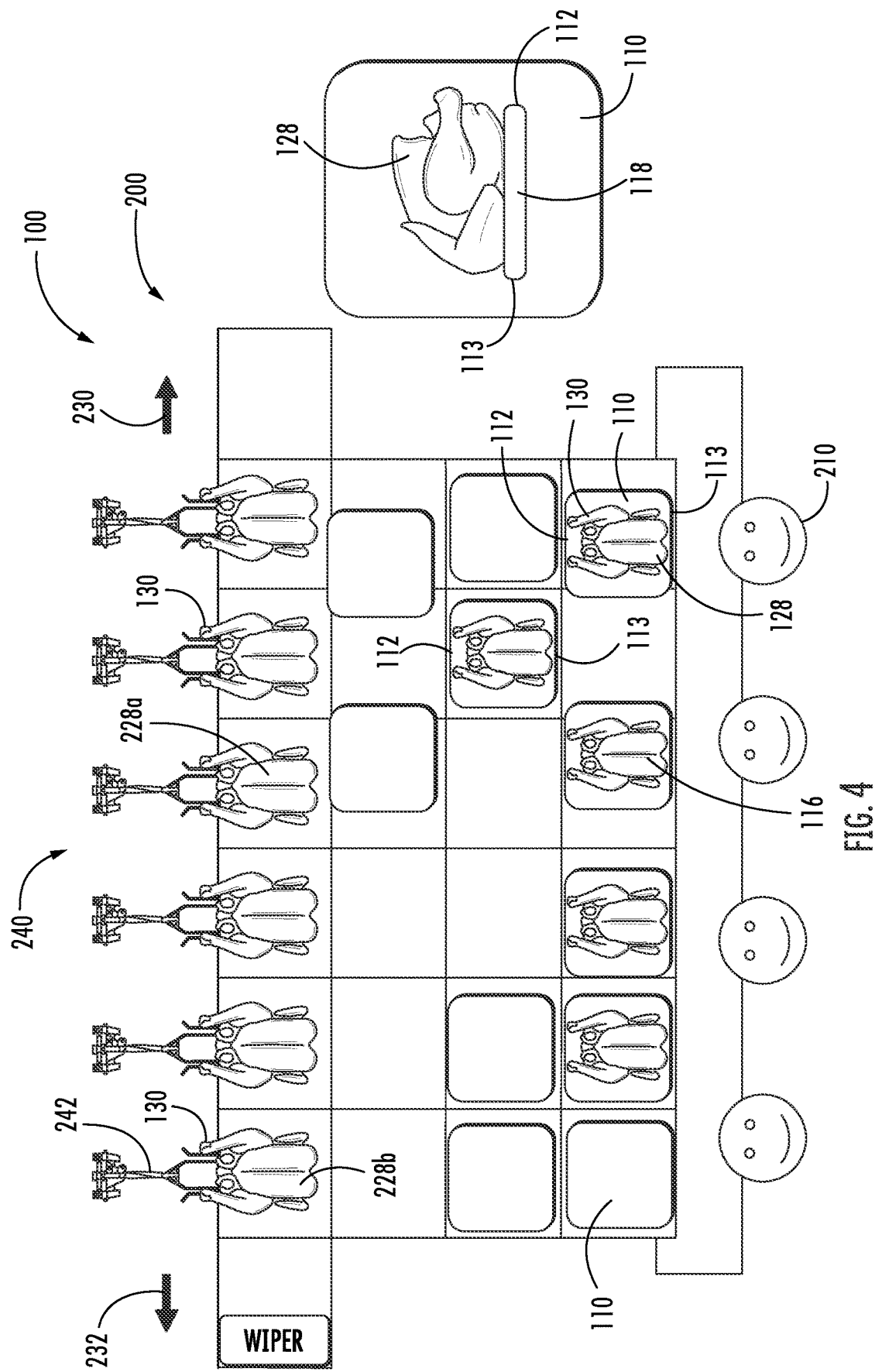
FIG. 4 is a plan view of an implementation of the disclosed subject matter showing the processing of food parts.

Referring to FIG. 4, an implementation of the disclosed subject matter is shown where the system 100 is used in a processing operation 200 to move non-live poultry items 116, such as gas stunned, or water chilled poultry carcasses 128, to a processing line 240 for further processing, such as cut up. In this example, an operator 210 receives poultry carcasses 128 and transfers the carcasses to a carrier 110. The carcass 128 has legs 130 as a first feature and an opposite neck cavity as a second feature. The operator 210 orientates the legs 130 adjacent to the first edge 112 and the neck opening adjacent the second edge 113. The system 100 is programmed to execute processing to have the carrier 110 weigh the carcass 128 and based on the weight of the item, moves the item to a processing line 240 where the carriers 110 are orientated with the first edge 112 adjacent an empty poultry shackle 242, and movement of the carrier 110 is synchronized with the movement of a poultry shackle 242 moving adjacent the processing line 240 such as parallel to the second area. The carrier 110 positions a component of the poultry carcass 128, such as the legs 130 of the poultry carcass 128 so they make contact with and engage the shackle 242 and the shackle 242 removes the carcass 128 from the carrier 110 for further processing. Based on the weight of the item, the system 100 is programmed to move the loaded carrier 110 to a processing line that is appropriate for the weight of the bird carcass 128 because the weight of a bird is an approximation for the size of a bird, and processing equipment is sized to work with birds of a particular weight range. For example, for a carcass 228a weighing from three to four pounds, the carrier 110 positions the item for further processing via a shackle 242a traveling to a first processing line 230, and for a carcass 228b weighing from five to seven pounds, the carrier 110 positions the item for processing via a shackle 242 traveling to a second processing line 232. The overall characteristics information associated with the carcass 128 and the information is associated with the shackle and the information moves with the item during further processing. When the carrier 110 detects the carcass 228 has been removed, the empty carrier 110 returns to an operator 210 for re-use.

Figure 5:
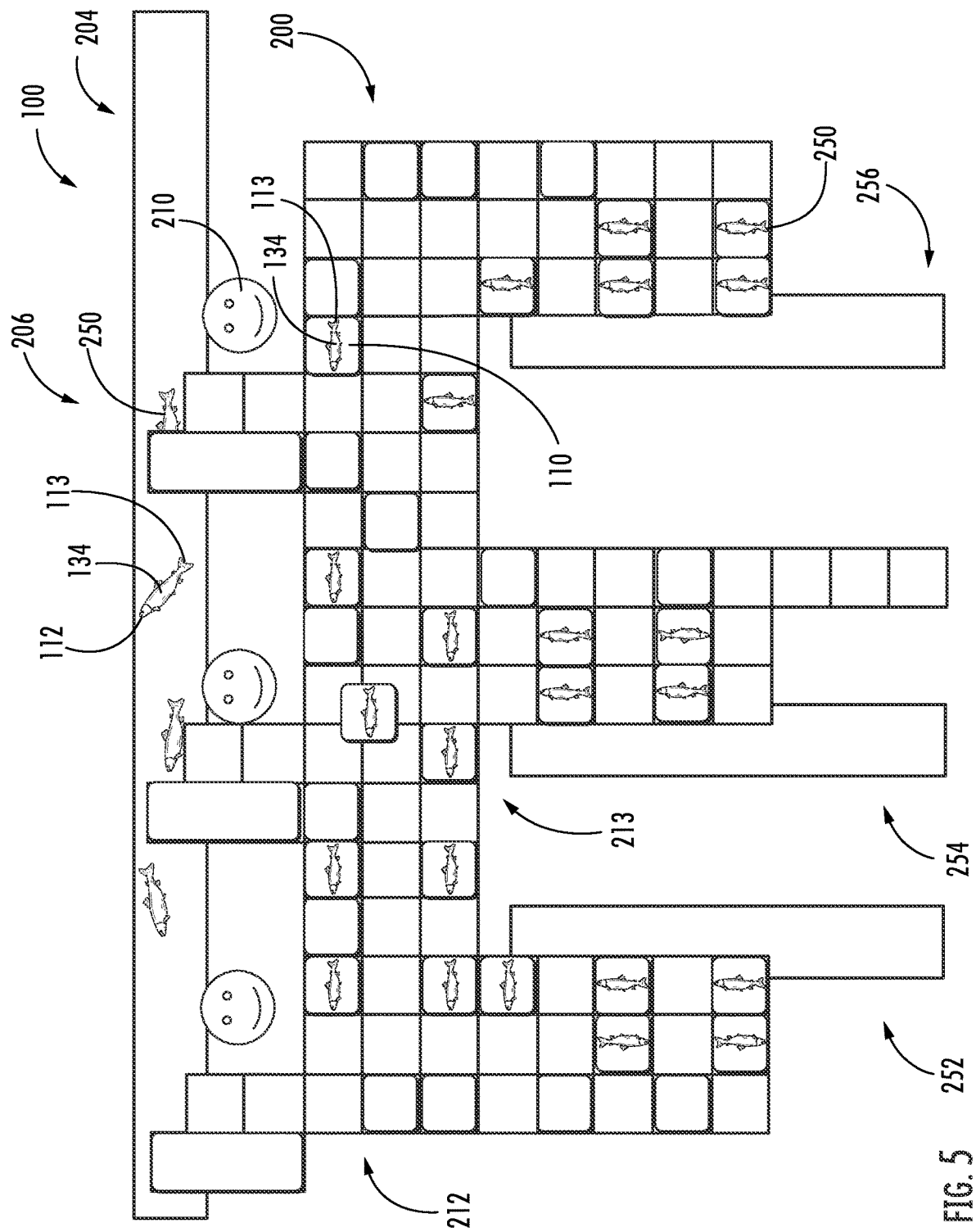
FIG. 5 is a plan view of an implementation of the disclosed subject matter showing the processing of food parts.

Referring to FIG. 5, an implementation of the disclosed subject matter is shown where the system 100 is used in a processing operation 200 to move seafood items 250, such as fish, to a processing line. The processing lines may include a first processing line 252 for target batches of seafood items 250 having a specified total weight, a second processing line 254 for hand processing of seafood items 250, and a third processing line 256 for processing seafood items 250 into filets.

In this example, an operator 210 receives a seafood item 250 arriving via a first transporter 204, such as a conveyor, and an operator 210 assesses the item 250 for various characteristics, including quality grade, weight, and color. The item 250 is moved to an unloaded carrier 110 and the item 250 is orientated on the carrier with a first feature adjacent the first edge 112, and a second feature adjacent the second edge 113. For example, a seafood item 250, such as a fish, has a head, left side, right side, belly, and tail, providing an irregular shape. The fish can be loaded on the carrier 110 where the head 134 is positioned adjacent the first edge 112 and the tail is adjacent the second edge 113. The system 100 is programmed to execute processing to move the loaded carriers 110 to one or more holding locations 213 in a holding area 212. Based on the attributes of the items 250 on each loaded carrier 110, the system 100 is programmed to determine the best attribute combination for each processing line. For example, if a target batch of two fish having the same weight is desired at the first processing line 252, the system 100 identifies two or more loaded carriers having fish matching the desired attribute, and the identified loaded carriers 110 are moved to processing line 252 for packaging. The system 100 may present the two loaded carriers 110 to the operator whereby the carriers 110 are positioned side-by-side, and the first carrier positions the carrier first edge 112 close to the operator and the second carrier positions the carrier second edge 113 close to the operator allowing the operator to efficiently load a tray with the fish positioned head to tail. The loaded tray can proceed to wrapping and distribution to the customer, and the now unloaded carriers 110 are returned to the arrival location 206 for re-loading.

In an implementation, the loaded carrier 110 moves the item 250 to a processing machine, such as a filet machine, and the carrier 110 discharges the item 250 into the filet machine resulting in the item 250 being cut. In an implementation, the loaded carrier 110 moves the item 250 through the filet machine, such as by abruptly changing the orientation of the carrier 110 by any combination of pitch, yaw, and roll, whereby and the resulting fileted item 250 is moved by the carrier 110 to a processing operation, such as packaging.

Certain terminology will be used in the following description for convenience in reference only and will not be limiting. For example, up, down, top, bottom, front, back, rear, right, left, forward, rearward, upward, and downward refer to the disclosed subject matter as orientated in the view being referred to, or in reference to such terminology designating the characteristics of an assembly as described in this description. Such terminology will include the words specifically mentioned, derivatives thereof, and words of similar meaning.

Having described the disclosed subject matter, what is claimed as new and desired to be secured by Letters Patent is:

1. A food processing system, comprising:
    a plurality of planar motors forming a conveyor system, wherein the planar motors produce magnetic fields, and wherein the conveyor system forms a holding area disposed between a first area and a second area;
    a plurality of carriers disposed above the planar motors, wherein the carriers include one or more magnets that interact with the magnetic fields, and wherein the magnetic fields are modulated to independently move the carriers relative to the planar motors;
    wherein the plurality of carriers include a first carrier, and a second carrier,
    wherein the first carrier supports a first food part with a first overall characteristic, and the second carrier supports a second food part with a second overall characteristic;
    wherein the second area includes a first desired batch overall characteristic;
    wherein the first overall characteristic and second overall characteristic are identified by a carrier distribution computer to meet the first desired batch overall characteristic; and
    wherein the carrier distribution computer commands the planar motors to move the first carrier and second carrier from the holding area to the second area.

2. The processing system of claim 1, wherein the carrier distribution computer determines a weight value of the food part supported by at least one of the plurality of carriers.

3. The processing system of claim 1, wherein the first food part is transferred from a first transporter to the first carrier by a transfer device.

4. The processing system of claim 1, further comprising:
    wherein the carrier distribution computer determines a first weight value of the first food part, and the carrier distribution computer determines a second weight value of the second food part;
    wherein the first food part and the second food part total a first batch weight;
    wherein the first batch weight is a sum of the first weight value and the second weight value; and the carrier distribution computer commands the planar motors to move the first carrier and second carrier to the second area.

5. The processing system of claim 4, further comprising: a processing step which includes a transfer of the first food part from the first carrier to a receptacle, and a transfer of the second food part from the second carrier to the receptacle.

6. The processing system of claim 5, further comprising wherein the planar motors move the first carrier and the second carrier to the first area.

7. The processing system of claim 1, wherein the first food part and the second food part encounter a processing step at the second area.

8. The processing system of claim 1, further comprising:
wherein the first carrier includes a first edge and an opposite second edge;
wherein the first edge is adjacent the first area when the first carrier is adjacent the first area; and
wherein the first edge is adjacent the second area when the first carrier is adjacent the second area.

9. The processing system of claim 7, wherein the first overall characteristic of the first food part is associated with the processing step.

10. The processing system of claim 1, further comprising:
a poultry shackle moving adjacent the second area; and
wherein the planar motors move the first carrier adjacent the poultry shackle.

11. The processing system of claim 10, wherein the first carrier is moved by the planar motor to engage the poultry parts with the poultry shackle.

12. A method of food processing, comprising:
providing a plurality of planar motors forming a holding area between a first area and a second area;
providing a plurality of carriers that are moved by the planar motors under control of a carrier distribution computer, wherein the vertical distance between a carrier and a planar motor forms an air gap, separating the carrier and planar motor from contact;
determining a characteristic of a first food item on a first carrier by the carrier distribution computer; and
moving the first carrier from the first area.

13. The method of claim 12, further comprising:
wherein the characteristic is the weight value of the first food item.

14. The method of claim 12, further comprising:
determining a characteristic of an food item on each of a plurality of carriers;
determining a target batch weight for a batch of food items;
identifying the food items totaling the target batch weight; and
moving the identified food items to the second area.

15. The method of claim 12, further comprising:
determining a weight value of an food item on each of a plurality of carriers, wherein the weight value is determined to be a first weight value or a second weight value;
providing the second area with a first unloading area and a second unloading area; and
moving the food item with the first weight value to the first unloading area, and moving the food item with the second weight value to the second unloading area.

16. The method of claim 12, further comprising:
wherein the moving includes moving each food item in synch with movement of a poultry shackle.

17. The method of claim 16, further comprising:
adjusting the air gap to engage the first food item with the poultry shackle.

18. The method of claim 12, further comprising:
moving the first food item through a food processing machine.

19. The method of claim 18, further comprising:
processing the first food item with a filet machine.

20. The method of claim 16, further comprising:
moving the poultry shackle into engagement with the first food item.

* * * * *